No. 705,037. Patented July 22, 1902.
C. F. CHRIST.
MACHINE FOR BOXING MATCHES.
(Application filed Aug. 12, 1901.)
(No Model.) 2 Sheets—Sheet 1.
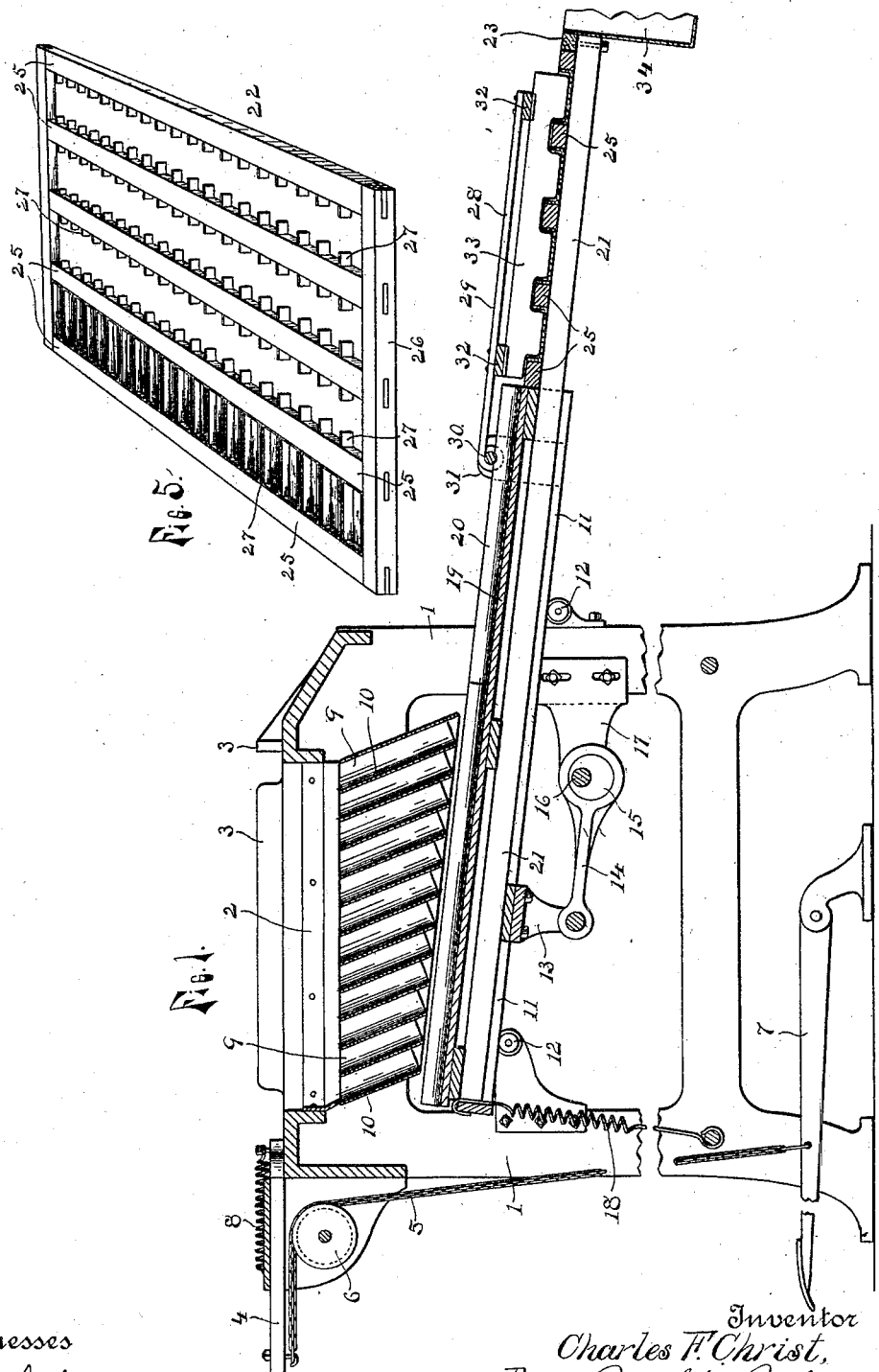
Witnesses
Inventor
Charles F. Christ,
Attorneys No. 705,037. Patented July 22, 1902.
C. F. CHRIST.
MACHINE FOR BOXING MATCHES.
(Application filed Aug. 12, 1901.)
(No Model.) 2 Sheets—Sheet 2.
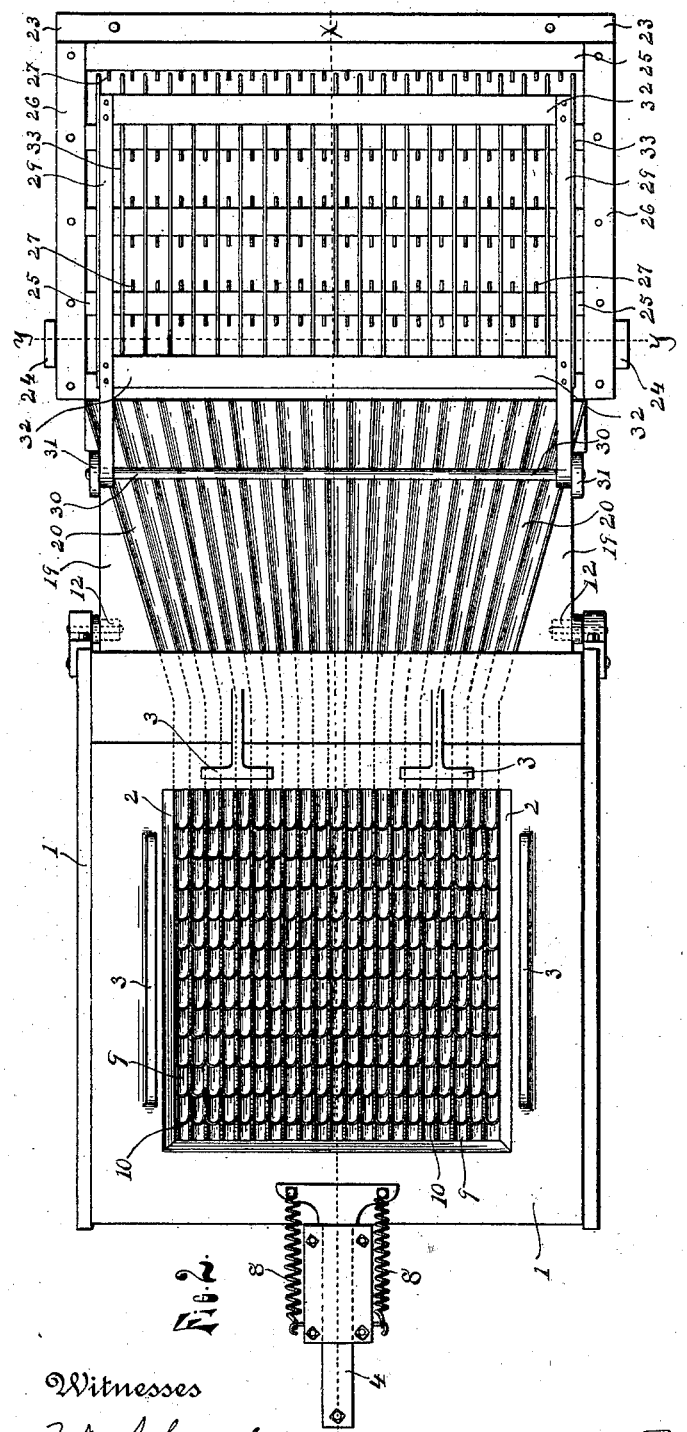
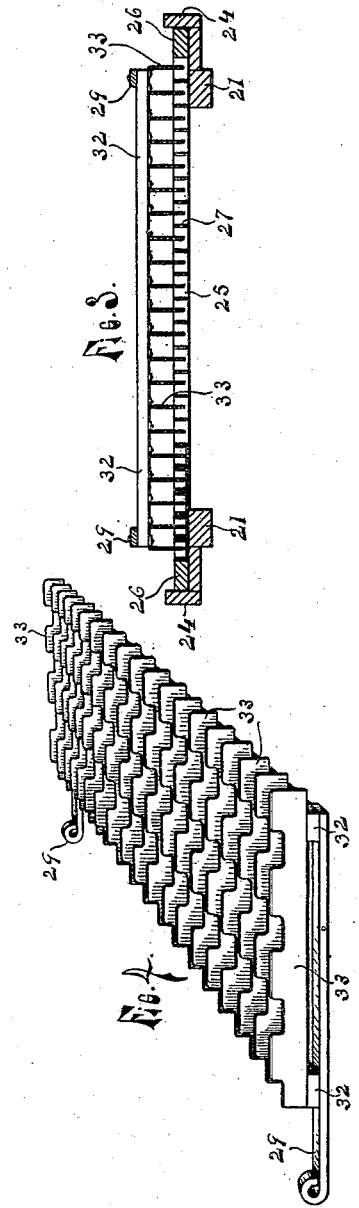
Witnesses
Inventor
Charles F. Christ,
By Barthel & Barthel
Attorneys

UNITED STATES PATENT OFFICE.

CHARLES F. CHRIST, OF DETROIT, MICHIGAN.

MACHINE FOR BOXING MATCHES.

SPECIFICATION forming part of Letters Patent No. 705,037, dated July 22, 1902.

Application filed August 12, 1901. Serial No. 71,693. (No model.)

*To all whom it may concern:*

Be it known that I, CHARLES F. CHRIST, a citizen of the United States of America, residing at Detroit, in the county of Wayne and State of Michigan, have invented certain new and useful Improvements in Machines for Boxing Matches, of which the following is a specification, reference being had therein to the accompanying drawings.

My invention relates to machines for boxing matches; and its object is to provide a machine adapted to receive the matches directly from the dipping-frames and place them in boxes without the intervention of hand labor and in such a manner that the danger of ignition in handling them is reduced to a minimum and consequent loss and injury to health of employes prevented.

My invention consists, essentially, in providing a hopper divided into compartments or inclined chutes for receiving the matches in an endwise position, a reciprocating feed-table provided with ways beneath said hopper, a detachable rack at the lower end of said feed-table and movable therewith adapted to hold rows of boxes, a pivoted frame provided with partitions to divide the boxes longitudinally into two parts, and in providing means for reciprocating the feed-table and box-frame, all so arranged and constructed that the matches pass in a longitudinal position down the chutes and ways into the first row of boxes, filling the same, and then move over the first row, filling the second, and so on until all of the boxes are filled, the surplus matches passing into a suitable receptacle at the lower end of the rack, from which they may be taken and again placed in the hopper, thus avoiding all waste and liability of igniting the matches by friction; and my invention further consists in the peculiar arrangement and construction of parts, all as more fully hereinafter described, and particularly pointed out in the claims, reference being had to the accompanying drawings, in which—

Figure 1 is a longitudinal vertical section on the line $x\,x$ of Fig. 2 of a device embodying my invention. Fig. 2 is a plan view of the same. Fig. 3 is a section on the line $y\,y$ of Fig. 2. Fig. 4 is a perspective view of the frame having the box-partitions, showing the same in an inverted position. Fig. 5 is a perspective view of the rack for holding the boxes, showing the same partially filled with boxes.

1 is the frame of the machine, having an opening at its top, in which is secured the hopper 2, ribs 3 being provided on the frame at three sides of the opening to engage an ordinary dipping-frame, and a plunger 4 is provided at the fourth side of the opening to engage the other side of the dipping-frame and compress the same to release the matches. Said plunger 4 is operated in one direction by springs 8, attached thereto at one end and to the machine-frame at their opposite ends, and in the opposite direction by a chain 5, attached at one end to said plunger and passing over a pulley 6 is attached at its opposite end to the foot-lever 7.

The lower end of the hopper 2 is divided by thin partitions into small open-end compartments or inclined chutes 9, provided with transversely-concaved lower sides 10, and are of such size in cross-section as to admit of the passage of the matches therethrough only in an endwise position, and thus when the matches are released from the dipping-frame they drop heads downward into the open ends of the chutes, the sides of said chutes maintaining the matches in that position and the concave lower sides tending to arrange said matches parallel with each other and with the vertical side of the chutes and to direct the course of the same.

Beneath the lower end of the hopper is the inclined frame 11, mounted upon rollers 12, journaled on brackets secured to the machine-frame, and to the lower side of said frame 11 is secured the hanger 13, to which is pivoted at one end the eccentric-rod 14, the opposite end of said rod being connected to the eccentric 15 on the driving-shaft 16. Adjustable brackets 17, provided with journal-bearings for said driving-shaft, are secured to the machine-frame by bolts passing through vertical slots in said brackets, and a coiled spring 18 is attached at one end to the machine-frame and at the opposite end to the upper end of the frame 11 to hold said frame in contact with the rollers 12 and steady its movement.

Secured to the top of the frame 11 is the feed-table 19, provided with a corrugated metal top 20, the corrugations corresponding in number to the number of longitudinal rows of chutes in the hopper and forming ways, down which the matches from each row pass, and secured to said frame beneath the table are the bars 21, which extend beyond the lower end of the feed-table and furnish a support for the box-holding rack 22, which rack is held in place thereon by the tie-bar 23 at the lower end of the bars and posts 24, which engage the ends of said rack. The rack 22 consists of five longitudinal parallel bars 25, tied together by the end bars 26, and projecting from the side of the bars 25 and into the space between said bars are the spacing-strips 27, of thin metal, which project between the boxes when the same are placed in the rack, the width of the space between said bars being the length of the boxes, the distance between the strips 27 the width of the boxes, and the thickness of the bars the height of said boxes, the bars and spacing-strips thus forming four transverse rows of pockets to receive the empty match-boxes, all lying in the same horizontal plane and open at the bottom. A pivoted frame 28 consists of side bars 29, formed each with an eye at one end to receive a rod 30, secured in bearings 31 at each side of the feed-table, and cross-bars 32, connecting the side bars, to which are secured the longitudinal parallel partitions 33, so spaced that when the box-rack is in place and the frame 28 lowered said partitions will divide the boxes longitudinally into equal parts, said partitions being cut away at their bottom sides opposite the bars 25 of the rack to allow the partitions to project into the boxes.

Secured to the outer side of the tie-bar 23 and extending across the machine is a receptacle 34 to catch the surplus matches that do not lodge in the boxes, but are carried by the vibration over the filled boxes and rack.

In this construction the danger of igniting the matches by friction, &c., which is so common when the hopper is vibrated, is obviated, as the matches fall directly from the dipping-frame into the inclined stationary chutes and pass freely down the same to the inclined ways below, the ways being only longitudinally vibrated to shake the matches down the incline, which vibration causes no friction and does not tend to ignite the matches. The said ways are wider at their lower ends, and each terminates opposite the end of a box, with its bottom in proximity to the top of the rack, so that the matches pass directly from the ways over the bar 25 and into the first rows of boxes without any fall, the partition 33 preventing the matches from turning so as to lie transversely of the boxes and the constant vibration causing the matches to lie closely and evenly with the boxes. When the first row of boxes has been filled, the matches will pass over the full boxes and adjacent bar into the next row without friction or injury, and so on until all of the boxes are filled, when the surplus matches will pass over the tie-bar 23 into the receptacle 34, from which they may be taken and again put into the hopper. A number of racks may be used, and when the boxes in one are filled it may be removed from the machine by raising the frame 28 and another rack, previously filled with empty boxes, put in its place. The bottoms of the boxes are unsupported by the rack, and so when filled and the rack removed from the machine the boxes may be pressed downward through the frame, thus greatly facilitating their removal therefrom.

What I claim as my invention is—

1. In a machine for boxing matches, the combination with longitudinally-movable ways, of a rack adapted to hold a series of transverse rows of match-boxes all lying in the same horizontal plane, a frame provided with downwardly-projecting parallel partitions adapted to enter the match-boxes and divide the same into two parts, said partitions being cut away at their lower sides opposite the ends of the boxes adjacent to each other.

2. In a machine for boxing matches, the combination with means for conveying the matches to the boxes, of a rack for holding match-boxes provided with a series of rows of pockets to receive the boxes, each pocket being open at its top and bottom.

3. In a machine for boxing matches, the combination with ways for conveying the matches, of a rack consisting of a series of transverse bars secured at a distance apart equal to the length of a match-box by end bars, and spacing-strips extending from the edges of said transverse bars and adapted to project between the boxes to form pockets open at the top and bottom.

4. In a machine for boxing matches, in combination with the frame thereof, provided with an opening in its top, a hopper secured within the opening and formed of inclined chutes having concave lower sides, a reciprocating frame beneath said hopper, brackets on the machine-frame, rolls on said brackets to support said reciprocating frame, adjustable brackets in the machine-frame provided with bearings, a driving-shaft in said bearings, an eccentric in said shaft, a hanger on the lower side of said reciprocating frame, an eccentric-rod connecting said hanger and eccentric, a spring secured at one end to the machine-frame, and at the other end to the upper end of the reciprocating frame, an inclined feed-table having a corrugated top forming ways on said reciprocating frame, longitudinal bars secured to the reciprocating frame and extending beyond said feed-table, a tie-bar connecting the lower ends of said bars, a receptacle secured to said tie-bar, a removable box-holding rack having parallel bars and spacing-strips, and a frame pivoted to the reciprocating frame and provided with a series of parallel partitions cut away opposite the parallel bars of the rack to allow the same to enter the match-boxes.

In testimony whereof I affix my signature in presence of two witnesses.

CHARLES F. CHRIST.

Witnesses:
OTTO F. BARTHEL,
JOSEPH A. NOELKE.